United States Patent
Roongta et al.

(10) Patent No.: US 12,093,919 B2
(45) Date of Patent: Sep. 17, 2024

(54) ELECTRONIC SYSTEM FOR AUTOMATICALLY GENERATING RESOURCE DISTRIBUTIONS BASED ON SMS-BASED INSTRUCTIONS USING MACHINE LEARNING

(71) Applicant: BANK OF AMERICA CORPORATION, Charlotte, NC (US)

(72) Inventors: Ashwin Roongta, East Brunswick, NJ (US); Aaron Blogg, New York, NY (US); Yvonne Y. Li, Jersey City, NJ (US); Leslieann Osborne, North Easton, MA (US); Anuj Shah, Jersey City, NJ (US); Thomas A. Sodano, New York, NY (US); Zhexiao Zhang, New Rochelle, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 862 days.

(21) Appl. No.: 17/188,979

(22) Filed: Mar. 1, 2021

(65) Prior Publication Data
US 2022/0277290 A1    Sep. 1, 2022

(51) Int. Cl.
G06Q 20/32        (2012.01)
G06F 40/295    (2020.01)
G06F 40/30        (2020.01)
G06N 20/00        (2019.01)
G06Q 20/38        (2012.01)

(52) U.S. Cl.
CPC ....... *G06Q 20/3255* (2013.01); *G06F 40/295* (2020.01); *G06F 40/30* (2020.01); *G06N 20/00* (2019.01); *G06Q 20/385* (2013.01); *G06Q 20/386* (2020.05)

(58) Field of Classification Search
CPC .......... G06N 20/00; G06N 3/0464; G06N 3/08
See application file for complete search history.

(56) References Cited

U.S. PATENT DOCUMENTS

| 10,664,697 B1 | 5/2020 | Patel et al. |
| 11,468,414 B1 | 10/2022 | David et al. |
| 2007/0203836 A1 | 8/2007 | Dodin |
| 2012/0030109 A1 | 2/2012 | Dooley Maley et al. |

(Continued)

OTHER PUBLICATIONS

Samuel Sharpe et al., Visual Natural Language Query Auto-Completion for Estimating Instance Probabilities, Oct. 10, 2019, Arxiv, pp. 1-4 (Year: 2019).

*Primary Examiner* — Tan H Tran
(74) *Attorney, Agent, or Firm* — Moore & Van Allen PLLC; R. W. McCord Rayburn

(57) ABSTRACT

Systems, computer program products, and methods are described herein for automatically generating resource distributions. The present invention may be configured to receive a text-based instruction and parse, using a machine learning model, the text-based instruction to generate a structured resource distribution including predicted distribution elements. The present invention may be configured to generate, based on the structured resource distribution, a resource distribution. In some embodiments, the text-based instruction may include an email message, an SMS message, recorded speech converted to text, text input to a chat function, text recognized in an image, and/or the like.

20 Claims, 3 Drawing Sheets

(56) References Cited

U.S. PATENT DOCUMENTS

| | | |
|---|---|---|
| 2019/0220843 A1 | 7/2019 | Kaithvas et al. |
| 2020/0322320 A1* | 10/2020 | Moon ................... G06F 21/40 |
| 2021/0365994 A1 | 11/2021 | Gibilterra et al. |
| 2021/0397788 A1 | 12/2021 | Yim |
| 2021/0406883 A1 | 12/2021 | Gaonkar et al. |
| 2022/0027915 A1 | 1/2022 | Cameron et al. |
| 2022/0129785 A1 | 4/2022 | Vogeti et al. |
| 2022/0164699 A1 | 5/2022 | Neupane et al. |
| 2022/0198411 A1* | 6/2022 | Jones ................... G06Q 20/42 |
| 2022/0245641 A1 | 8/2022 | Wintle et al. |

* cited by examiner

ELECTRONIC SYSTEM FOR AUTOMATICALLY GENERATING RESOURCE DISTRIBUTIONS BASED ON SMS-BASED INSTRUCTIONS USING MACHINE LEARNING

FIELD OF THE INVENTION

The present invention embraces an electronic system for automatically generating resource distributions based on SMS-based instructions using machine learning.

BACKGROUND

A sending user may provide, to an entity, text-based instructions requesting that the entity distribute resources from a source retainer managed by the entity and associated with the sending user to another source retainer associated with a recipient user. Another user associated with the entity may read the text-based instructions, search one or more databases to identify data associated with the sending user, the source retainer, the recipient user, and the other source retainer, and input, to a system associated with the entity, the data associated with the sending user, the source retainer, the recipient user, and the other source retainer to generate a resource distribution.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. This summary presents some concepts of one or more embodiments of the present invention in a simplified form as a prelude to the more detailed description that is presented later.

In one aspect, the present invention embraces a system for automatically generating resource distributions. The system may include at least one non-transitory storage device and at least one processing device coupled to the at least one non-transitory storage device, where the at least one processing device is configured to receive a text-based instruction, parse, using a machine learning model, the text-based instruction to generate a structured resource distribution including predicted distribution elements, and generate, based on the structured resource distribution, a resource distribution.

In some embodiments, the text-based instruction includes at least one of an email message, an SMS message, recorded speech converted to text, text input to a chat function, or text recognized in an image.

In some embodiments, the at least one processing device is configured to, when parsing the text-based instruction, parse, using the machine learning model, the text-based instruction to identify, based on statistical patterns, named elements in the text-based instruction, identify, based on rules, additional elements in the text-based instruction, sort, based on surrounding words in the text-based instruction and syntactic roots, the named elements and the additional elements into the predicted distribution elements, and assemble the predicted distribution elements into the structured resource distribution.

In some embodiments, the predicted distribution elements include at least one of a predicted sending source retainer, a predicted receiving source retainer, a predicted amount of resources to be distributed, a predicted type of resource distribution, a predicted type of resources to be distributed, a predicted date on which resources are to be distributed, a predicted frequency at which resources are to be distributed, a predicted type of sending source retainer, or a predicted type of receiving source retainer.

In some embodiments, the at least one processing device is further configured to parse, using the machine learning model, the text-based instruction to determine additional information associated with the text-based instruction. Additionally, or alternatively, the additional information includes at least one of the sender alias, a recipient alias to which the text-based instruction was sent, an entity associated with the resource distribution, a name of the user, an address of the user, or content of the text-based instruction.

In some embodiments, the at least one processing device is configured to, when parsing the text-based instruction, parse, using the machine learning model, the text-based instruction to identify multiple resource distributions within the text-based instruction and generate, for each resource distribution of the multiple resource distributions, a structured resource distribution.

In some embodiments, the at least one processing device is configured to provide, to another user, the resource distribution for authorization.

In some embodiments, the at least one processing device is configured to perform the resource distribution.

In another aspect, the present invention embraces a computer program product for automatically generating resource distributions. The computer program product may include a non-transitory computer-readable medium including code causing a first apparatus to receive a text-based instruction, parse, using a machine learning model, the text-based instruction to generate a structured resource distribution including predicted distribution elements, and generate, based on the structured resource distribution, a resource distribution.

In some embodiments, the text-based instruction includes at least one of an email message, an SMS message, recorded speech converted to text, text input to a chat function, or text recognized in an image.

In some embodiments, the non-transitory computer-readable medium includes code causing the first apparatus to, when parsing the text-based instruction, parse, using the machine learning model, the text-based instruction to identify, based on statistical patterns, named elements in the text-based instruction, identify, based on rules, additional elements in the text-based instruction, sort, based on surrounding words in the text-based instruction and syntactic roots, the named elements and the additional elements into the predicted distribution elements, and assemble the predicted distribution elements into the structured resource distribution.

In some embodiments, the predicted distribution elements may include at least one of a predicted sending source retainer, a predicted receiving source retainer, a predicted amount of resources to be distributed, a predicted type of resource distribution, a predicted type of resources to be distributed, a predicted date on which resources are to be distributed, a predicted frequency at which resources are to be distributed, a predicted type of sending source retainer, or a predicted type of receiving source retainer.

In some embodiments, the non-transitory computer-readable medium may include code causing the first apparatus to, parse, using the machine learning model, the text-based instruction to determine additional information associated with the text-based instruction. Additionally, or alternatively, the additional information may include at least one of a sender alias from which the text-based instruction was sent, a recipient alias to which the text-based instruction was sent, an entity associated with the resource distribution, a name of a user, an address of the user, or content of the text-based instruction.

In some embodiments, the non-transitory computer-readable medium may include code causing the first apparatus to, parse, using the machine learning model, the text-based instruction to identify multiple resource distributions within the text-based instruction and generate, for each resource distribution of the multiple resource distributions, a structured resource distribution.

In some embodiments, the non-transitory computer-readable medium may include code causing the first apparatus to provide, to another user, the resource distribution for authorization.

In some embodiments, the non-transitory computer-readable medium may include code causing the first apparatus to perform the resource distribution.

In yet another aspect, the present invention embraces a method for automatically generating resource distributions. The method may include receiving a text-based instruction, parsing, using a machine learning model, the text-based instruction to generate a structured resource distribution including predicted distribution elements, determining, based on the text-based instruction, a sender alias from which the text-based instruction was sent, determining, based on user data in a user information data structure, a user associated with the sender alias, determining, based on user data associated with the user in the user information data structure and based on the predicted distribution elements, actual distribution elements, and generating, based on the actual distribution elements, a resource distribution.

In some embodiments, the text-based instruction may include at least one of an email message, an SMS message, recorded speech converted to text, text input to a chat function, or text recognized in an image.

The features, functions, and advantages that have been discussed may be achieved independently in various embodiments of the present invention or may be combined with yet other embodiments, further details of which may be seen with reference to the following description and drawings.

BRIEF DESCRIPTION OF THE DRAWINGS

Figure 1:
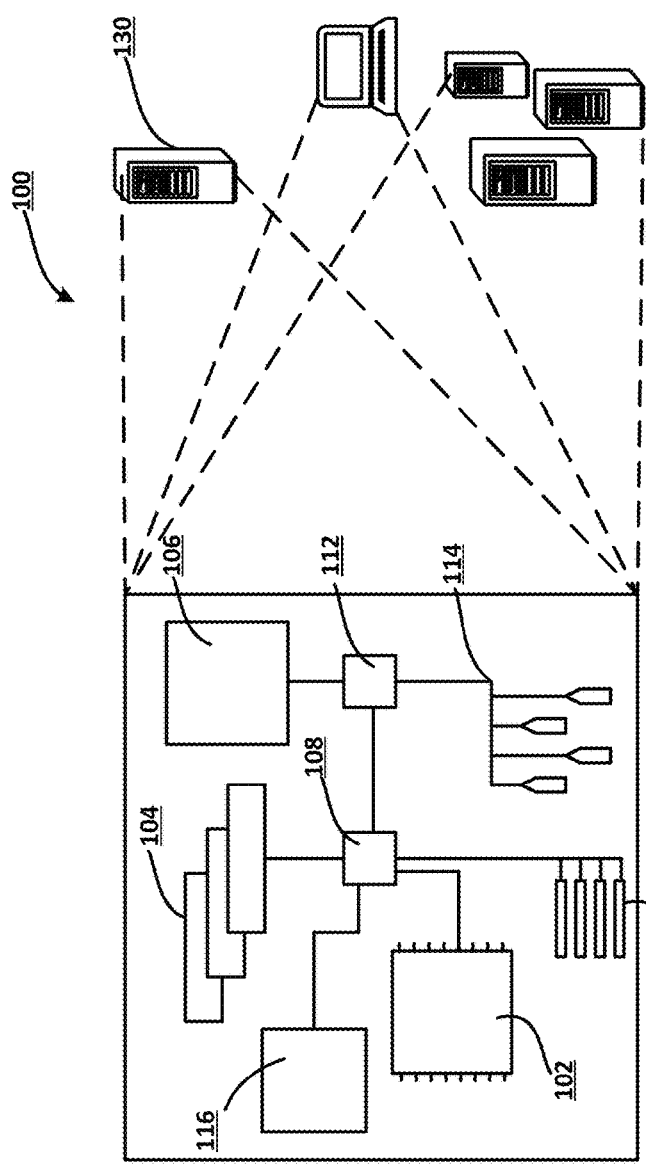
Figure 1:
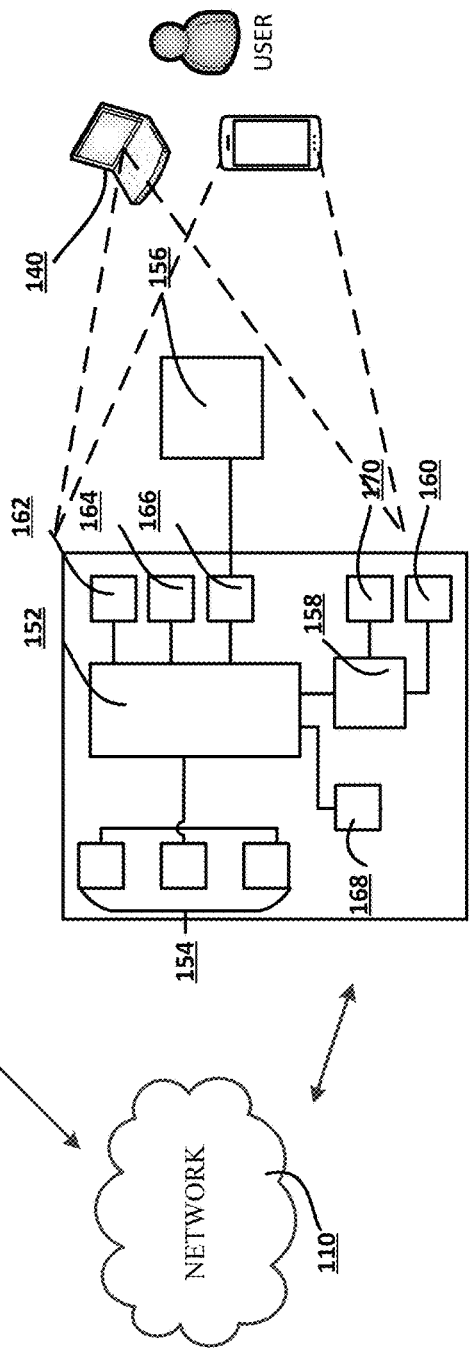
Figure 2:
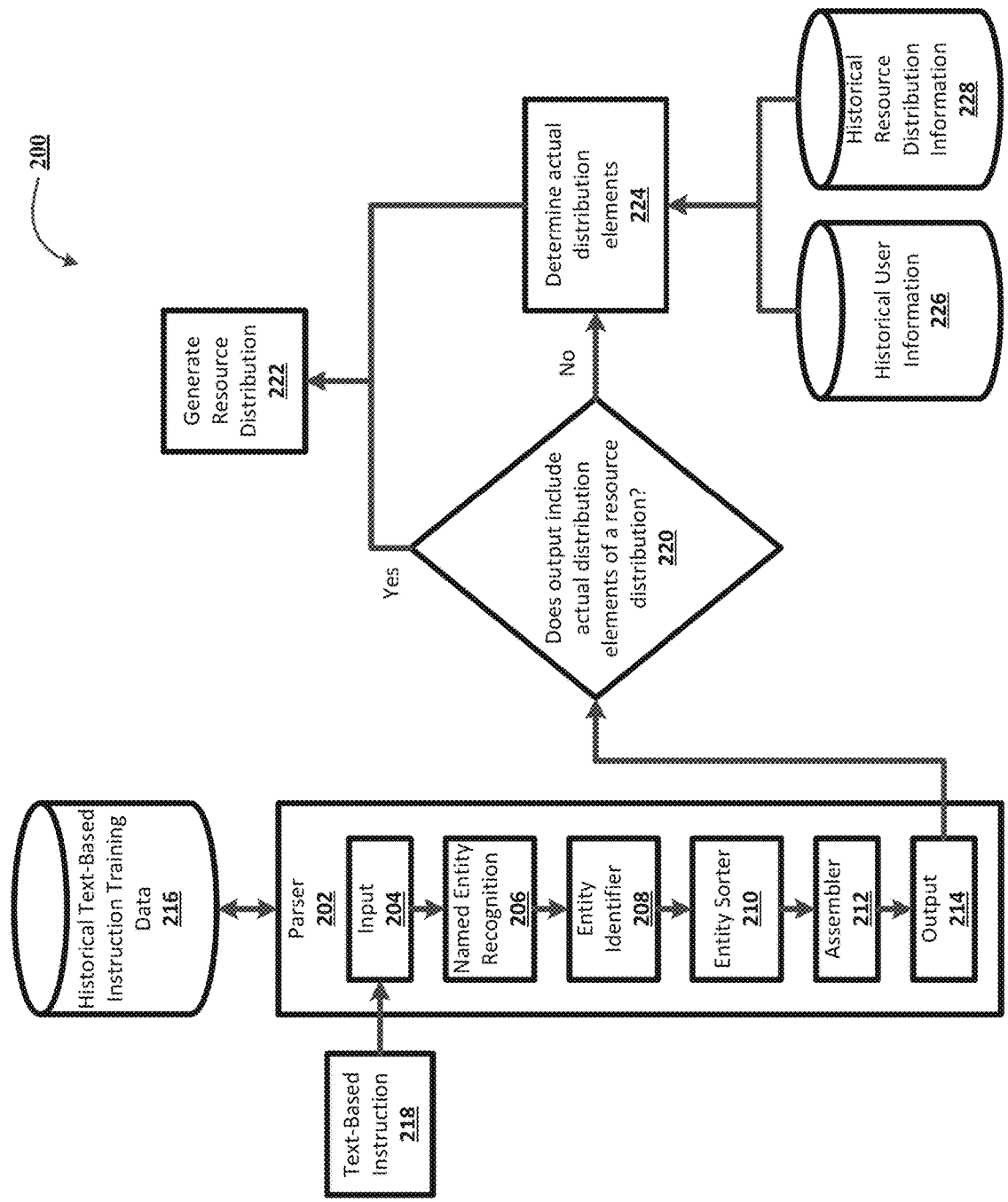
Figure 3:
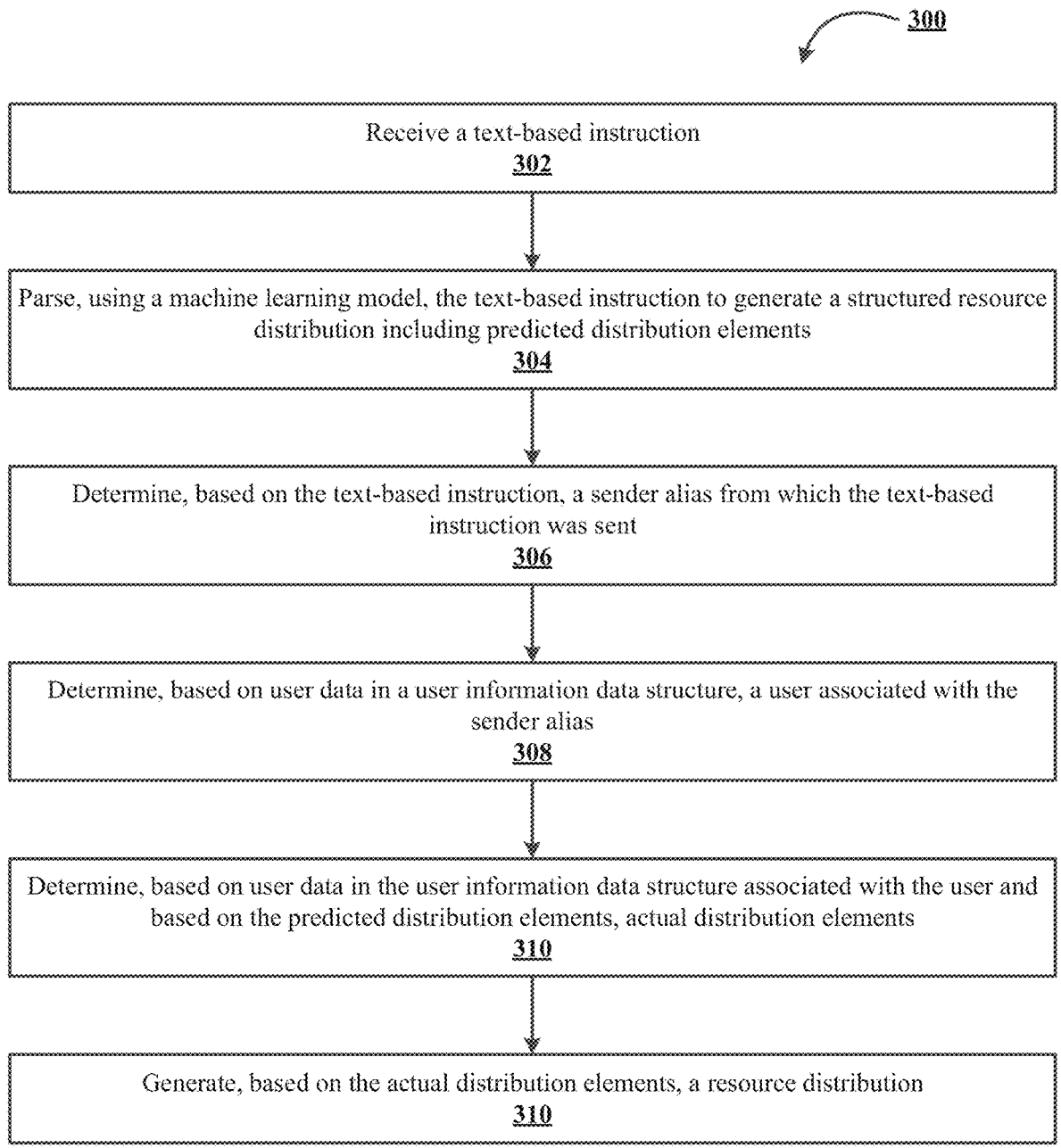

Having thus described embodiments of the invention in general terms, reference will now be made the accompanying drawings, wherein:

FIG. 1 illustrates technical components of a system for automatically generating resource distributions, in accordance with an embodiment of the invention;

FIG. 2 illustrates a process flow for automatically generating resource distributions, in accordance with an embodiment of the invention; and FIG. 3 illustrates a process flow for automatically generating resource distributions, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, the data may be related to products, services, and/or the like offered and/or provided by the entity, customers of the entity, other aspect of the operations of the entity, people who work for the entity, and/or the like. As such, the entity may be an institution, group, association, financial institution, establishment, company, union, authority, merchant, service provider, and/or or the like, employing information technology resources for processing large amounts of data.

As used herein, a "user" may be an individual associated with an entity. As such, in some embodiments, the user may be an individual having past relationships, current relationships or potential future relationships with an entity. In some embodiments, a "user" may be an employee (e.g., an associate, a project manager, a manager, an administrator, an internal operations analyst, and/or the like) of the entity and/or enterprises affiliated with the entity, capable of operating systems described herein. In some embodiments, a "user" may be any individual, another entity, and/or a system who has a relationship with the entity, such as a customer, a prospective customer, and/or the like. In some embodiments, a user may be a system performing one or more tasks described herein.

As used herein, a "user interface" may be any device or software that allows a user to input information, such as commands and/or data, into a device, and/or that allows the device to output information to the user. For example, a user interface may include a graphical user interface (GUI) and/or an interface to input computer-executable instructions that direct a processing device to carry out functions. The user interface may employ input and/or output devices to input data received from a user and/or output data to a user. Input devices and/or output devices may include a display, mouse, keyboard, button, touchpad, touch screen, microphone, speaker, LED, light, joystick, switch, buzzer, bell, and/or other devices for communicating with one or more users.

As used herein, a "resource" may generally refer to objects, products, devices, goods, commodities, services, offers, discounts, currency, cash, cash equivalents, rewards, reward points, benefit rewards, bonus miles, cash back, credits, and/or the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, and/or the like.

As used herein, a "source retainer" may generally refer to an account, a system, and/or the like associated with a user and/or a type of resources, such as a checking account, a deposit account, a savings account, a credit account, a rewards account, a rewards points account, a benefit rewards account, a bonus miles account, a cash back account, and/or the like, which may be managed and/or maintained by an entity, such as a financial institution, an electronic resource transfer institution (e.g., a credit card company, a debit card company, a prepaid card company, and/or the like), a credit union, and/or the like.

As used herein, a "distribution" and/or an "allocation" may refer to any transaction, activities, and/or communication between one or more entities, between a user and one or more entities, and/or the like. A resource distribution and/or an allocation of resources may refer to any distribution of resources such as, but not limited to, a payment, processing of funds, purchase of goods or services, a return of goods or services, a payment transaction, a credit transaction, other interactions involving a user's resource or account, and/or the like. In the context of an entity such as a financial institution, a resource distribution and/or an allocation of resources may refer to one or more of a sale of goods and/or services, initiating an automated teller machine (ATM) or online financial session, an account balance inquiry, a rewards transfer, an account money transfer or withdrawal, opening a financial application on a user's computer or mobile device, a user accessing their e-wallet, any other interaction involving the user and/or the user's device that invokes and/or is detectable by the financial institution, and/or the like. In some embodiments, the user may authorize a resource distribution and/or an allocation of resources using a resource distribution instrument (e.g., credit cards, debit cards, checks, digital wallets, currency, loyalty points, and/or the like) and/or resource distribution credentials (e.g., account numbers, resource distribution instrument identifiers, and/or the like). A resource distribution and/or an allocation of resources may include one or more of the following: renting, selling, and/or leasing goods and/or services (e.g., groceries, stamps, tickets, DVDs, vending machine items, and/or the like); making payments to creditors (e.g., paying monthly bills; paying federal, state, and/or local taxes, and/or the like); sending remittances; loading money onto stored value cards (SVCs) and/or prepaid cards; donating to charities; and/or the like. Unless specifically limited by the context, a "resource distribution," an "allocation of resources," a "resource transfer," a "transaction," a "transaction event," and/or a "point of transaction event" may refer to any activity between a user, a merchant, an entity, and/or the like. In some embodiments, a resource distribution and/or an allocation of resources may refer to financial transactions involving direct or indirect movement of funds through traditional paper transaction processing systems (e.g., paper check processing) or through electronic transaction processing systems. In this regard, resource distributions and/or allocations of resources may refer to the user initiating a purchase for a product, service, and/or the like from a merchant. Financial resource distribution and/or financial allocations of resources may include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points, and/or the like. When describing that resource transfers or transactions are evaluated, such descriptions may mean that the transaction has already occurred, is in the process of occurring and/or being processed, and/or has yet to be processed/posted by one or more financial institutions.

As used herein, "resource distribution instrument" may refer to an electronic payment vehicle, such as an electronic credit card, debit card, and/or the like, associated with a source retainer (e.g., a checking account, a deposit account, a savings account, a credit account, and/or the like). In some embodiments, the resource distribution instrument may not be a "card" and may instead be account identifying information stored electronically in a user device, such as payment credentials and/or tokens and/or aliases associated with a digital wallet, account identifiers stored by a mobile application, and/or the like.

In some embodiments, the term "module" with respect to an apparatus may refer to a hardware component of the apparatus, a software component of the apparatus, and/or a component of the apparatus that includes both hardware and software. In some embodiments, the term "chip" may refer to an integrated circuit, a microprocessor, a system-on-a-chip, a microcontroller, and/or the like that may either be integrated into the external apparatus, may be inserted and/or removed from the external apparatus by a user, and/or the like.

As used herein, an "engine" may refer to core elements of a computer program, part of a computer program that serves as a foundation for a larger piece of software and drives the functionality of the software, and/or the like. An engine may be self-contained but may include externally-controllable code that encapsulates powerful logic designed to perform or execute a specific type of function. In one aspect, an engine may be underlying source code that establishes file hierarchy, input and/or output methods, how a part of a computer program interacts and/or communicates with other software and/or hardware, and/or the like. The components of an engine may vary based on the needs of the computer program as part of the larger piece of software. In some embodiments, an engine may be configured to retrieve resources created in other computer programs, which may then be ported into the engine for use during specific operational aspects of the engine. An engine may be configurable to be implemented within any general-purpose computing system. In doing so, the engine may be configured to execute source code embedded therein to control specific features of the general-purpose computing system to execute specific computing operations, thereby transforming the general-purpose system into a specific purpose computing system.

As used herein, a "component" of an application may include a software package, a service, a resource, a module, and/or the like that includes a set of related functions and/or data. In some embodiments, a component may provide a source capability (e.g., a function, a business function, and/or the like) to an application including the component. In some embodiments, components of an application may communicate with each other via interfaces and may provide information to each other indicative of the services and/or functions that other components may utilize and/or how other components may utilize the services and/or functions. Additionally, or alternatively, components of an application may be substitutable such that a component may replace another component. In some embodiments, components may include objects, collections of objects, and/or the like.

As used herein, "authentication credentials" may be any information that may be used to identify a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device, and/or the like. The authentication information may be used to authenticate the identity of the user (e.g., determine that the authentication information is associated with an account) and/or determine that the user has authority to access an account or system. In some embodiments, the system may be owned and/or operated by an entity. In such embodiments, the entity may employ additional computer systems, such as authentication servers, to validate and certify resources inputted by a plurality of users within the system. The system may further use authentication servers to certify the identity of users of the system, such that other users may verify the identity of the certified users. In some embodiments, the entity may certify the identity of the users. Furthermore, authentication information and/or permission may be assigned to and/or required from a user, application, computing node, computing cluster, and/or the like to access stored data within at least a portion of the system.

As used herein, an "interaction" may refer to any communication between one or more users, one or more entities or institutions, and/or one or more devices, nodes, clusters, and/or systems within the system environment described herein. For example, an interaction may refer to a transfer of data between devices, an accessing of stored data by one or more nodes of a computing cluster, a transmission of a requested task, and/or the like. In some embodiments, an interaction may refer to an entity, a user, a system, and/or a device providing an advertisement, information, data, a user interface, and/or the like to another entity, another user, another system, and/or another device.

As noted, a sending user (e.g., a client, a payor, and/or the like) may provide, to an entity (e.g., a financial institution and/or the like), text-based instructions requesting that the entity distribute resources (e.g., conduct a wire transfer, conduct a transaction, transfer funds, and/or the like) from a source retainer (e.g., a checking account, a deposit account, a savings account, a credit account, and/or the like) managed by the entity and associated with the sending user to another source retainer associated with a recipient user (e.g., a payee and/or the like). Another user associated with the entity (e.g., an associate, an employee, and/or the like) may read the text-based instructions, search one or more databases to identify data associated with the sending user, the source retainer, the recipient user, and the other source retainer, and input, to a system associated with the entity, the data associated with the sending user, the source retainer, the recipient user, and the other source retainer to generate a resource distribution. However, searching databases to identify various data inputs to complete the resource distribution consumes computing resources (e.g., processing resources, memory resources, power resources, communication resources, and/or the like) and/or network resources. Furthermore, receiving a high volume of text-based instructions requires a plurality of users associated with the entity thereby consuming financial resources, requires that the plurality of users associated with the entity read all of the text-based instructions thereby consuming additional financial resources, and requires that the plurality of users associated with the entity manually input various data inputs to complete the resource distributions thereby increasing a likelihood of errors.

Some embodiments described herein provide a system, a computer program product, and/or a method automatically generating resource distributions. For example, a system (e.g., an electronic system for automatically generating resource distributions based on SMS-based instructions using machine learning and/or the like) may be configured to receive text-based instructions (e.g., email messages, SMS messages, recorded speech converted to text, text input to a chat function, text recognized in images, and/or the like) and parse, using a machine learning model, the text-based instructions to generate a structured resource distribution including predicted distribution elements. The system may be configured to determine, based on user data associated with a user in the user information data structure and based on the predicted distribution elements, actual distribution elements and generate, based on the actual distribution elements, a resource distribution. In some embodiments, the system may be configured to parse the text-based instructions to obtain partial information regarding one or more elements of the resource distribution (e.g., part of an account number, a first name but not a last name, and/or the like) and determine, based on user data in the user information data structure and the partial information, complete information (e.g., a full account number, a first and last name, and/or the like) that may be used as an actual distribution element in a resource distribution. Additionally, or alternatively, the system may be configured to determine that multiple possible distribution elements are associated with a predicted distribution element obtained by parsing the instructions, determine, based on a frequency of usage of the multiple possible distribution elements and based on a timing of usage of the multiple possible distribution elements, a likelihood of each of the multiple possible distribution elements corresponding to the predicted distribution element, and provide, to a user associated with an entity (e.g., an associate, an employee, and/or the like) and in an order based on the likelihood of each of the multiple possible distribution elements corresponding to the predicted distribution element, the multiple possible distribution elements for selection by the user for generation in the resource distribution (e.g., via a drop-down menu and/or the like).

By parsing the text-based instruction, determining actual distribution elements from user data, and/or generating the resource distribution, the system conserves the computing resources (e.g., processing resources, memory resources, power resources, communication resources, and/or the like) and/or network resources that would otherwise be consumed by searching databases to identify various data inputs to complete the resource distribution. Furthermore, the system may receive a high volume of text-based instructions and accurately generate resource distributions thereby conserving the financial resources that would otherwise be consumed by requiring a plurality of users to read the text-based instructions and provide inputs to generate the resource distributions.

FIG. 1 presents an exemplary block diagram of a system environment 100 for automatically generating resource distributions within a technical environment, in accordance with an embodiment of the invention. FIG. 1 provides a system environment 100 that includes specialized servers and a system communicably linked across a distributive network of nodes required to perform functions of process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device, a non-mobile computing device, and/or the like. The user may be a person who uses the user input system 140 to access, view modify, interact with, and/or the like information, data, images, video, and/or the like. The one or more applications may be configured to communicate with the system 130, input information onto a user interface presented on the user input system 140, and/or the like. The applications stored on the user input system 140 and the system 130 may incorporate one or more parts of any process flow described herein.

As shown in FIG. 1, the system 130 and the user input system 140 are each operatively and selectively connected to the network 110, which may include one or more separate networks. In some embodiments, the network 110 may include a telecommunication network, local area network (LAN), a wide area network (WAN), and/or a global area network (GAN), such as the Internet. Additionally, or alternatively, the network 110 may be secure and/or unsecure and may also include wireless and/or wired and/or optical interconnection technology.

In some embodiments, the system 130 and the user input system 140 may be used to implement processes described herein, including user-side and server-side processes for automatically generating resource distributions, in accordance with an embodiment of the present invention. The system 130 may represent various forms of digital computers, such as laptops, desktops, workstations, personal digital assistants, servers, blade servers, mainframes, and/or the like. The user input system 140 may represent various forms of mobile devices, such as personal digital assistants, cellular telephones, smartphones, smart glasses, and/or the like. The components shown here, their connections, their relationships, and/or their functions, are meant to be exemplary only, and are not meant to limit implementations of the inventions described and/or claimed in this document.

In some embodiments, the system 130 may include a processor 102, memory 104, a storage device 106, a high-speed interface 108 connecting to memory 104, high-speed expansion ports 111, and a low-speed interface 112 connecting to low-speed bus 114 and storage device 106. Each of the components 102, 104, 106, 108, 111, and 112 may be interconnected using various buses, and may be mounted on a common motherboard or in other manners as appropriate. The processor 102 may process instructions for execution within the system 130, including instructions stored in the memory 104 and/or on the storage device 106 to display graphical information for a GUI on an external input/output device, such as a display 116 coupled to a high-speed interface 108. In some embodiments, multiple processors, multiple buses, multiple memories, multiple types of memory, and/or the like may be used. Also, multiple systems, same or similar to system 130 may be connected, with each system providing portions of the necessary operations (e.g., as a server bank, a group of blade servers, a multi-processor system, and/or the like). In some embodiments, the system 130 may be managed by an entity, such as a business, a merchant, a financial institution, a card management institution, an software and/or hardware development company, a software and/or hardware testing company, and/or the like. The system 130 may be located at a facility associated with the entity and/or remotely from the facility associated with the entity.

The memory 104 may store information within the system 130. In one implementation, the memory 104 may be a volatile memory unit or units, such as volatile random-access memory (RAM) having a cache area for the temporary storage of information. In another implementation, the memory 104 may be a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 may be capable of providing mass storage for the system 130. In one aspect, the storage device 106 may be or contain a computer-readable medium, such as a floppy disk device, a hard disk device, an optical disk device, a tape device, a flash memory and/or other similar solid state memory device, and/or an array of devices, including devices in a storage area network or other configurations. A computer program product may be tangibly embodied in an information carrier. The computer program product may also contain instructions that, when executed, perform one or more methods, such as those described herein. The information carrier may be a non-transitory computer-readable or machine-readable storage medium, such as the memory 104, the storage device 106, and/or memory on processor 102.

In some embodiments, the system 130 may be configured to access, via the network 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel and/or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, the memory may appear to be allocated from a central pool of memory, even though the memory space may be distributed throughout the system. Such a method of dynamically allocating memory provides increased flexibility when the data size changes during the lifetime of an application and allows memory reuse for better utilization of the memory resources when the data sizes are large.

The high-speed interface 108 may manage bandwidth-intensive operations for the system 130, while the low-speed interface 112 and/or controller manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In some embodiments, low-speed interface 112 and/or controller is coupled to storage device 106 and low-speed bus 114 (e.g., expansion port). The low-speed bus 114, which may include various communication ports (e.g., USB, Bluetooth, Ethernet, wireless Ethernet), may be coupled to one or more input/output devices, such as a keyboard, a pointing device, a scanner, and/or a networking device such as a switch or router (e.g., through a network adapter).

The system 130 may be implemented in a number of different forms, as shown in FIG. 1. For example, it may be implemented as a standard server or multiple times in a group of such servers. Additionally, or alternatively, the system 130 may be implemented as part of a rack server system, a personal computer, such as a laptop computer, and/or the like. Alternatively, components from system 130 may be combined with one or more other same or similar systems and the user input system 140 may be made up of multiple computing devices communicating with each other.

FIG. 1 also illustrates a user input system 140, in accordance with an embodiment of the invention. The user input system 140 may include a processor 152, memory 154, an input/output device such as a display 156, a communication interface 158, and a transceiver 160, among other components, such as one or more image sensors. The user input system 140 may also be provided with a storage device, such as a microdrive and/or the like, to provide additional storage. Each of the components 152, 154, 158, and 160, may be interconnected using various buses, and several of the components may be mounted on a common motherboard or in other manners as appropriate.

The processor 152 may be configured to execute instructions within the user input system 140, including instructions stored in the memory 154. The processor 152 may be implemented as a chipset of chips that include separate and multiple analog and/or digital processors. The processor 152 may be configured to provide, for example, for coordination of the other components of the user input system 140, such as control of user interfaces, applications run by user input system 140, and/or wireless communication by user input system 140.

The processor 152 may be configured to communicate with the user through control interface 164 and display interface 166 coupled to a display 156. The display 156 may be, for example, a Thin-Film-Transistor Liquid Crystal Display (TFT LCD) or an Organic Light Emitting Diode (OLED) display, and/or other appropriate display technology. An interface of the display 156 may include appropriate circuitry and may be configured for driving the display 156 to present graphical and other information to a user. The control interface 164 may receive commands from a user and convert them for submission to the processor 152. In addition, an external interface 168 may be provided in communication with processor 152 to enable near area communication of user input system 140 with other devices. External interface 168 may provide, for example, for wired communication in some implementations, or for wireless communication in other implementations, and multiple interfaces may also be used.

The memory 154 may store information within the user input system 140. The memory 154 may be implemented as one or more of a computer-readable medium or media, a volatile memory unit or units, or a non-volatile memory unit or units. Expansion memory may also be provided and connected to user input system 140 through an expansion interface (not shown), which may include, for example, a Single In Line Memory Module (SIMM) card interface. Such expansion memory may provide extra storage space for user input system 140 and/or may store applications and/or other information therein. In some embodiments, expansion memory may include instructions to carry out or supplement the processes described above and/or may include secure information. For example, expansion memory may be provided as a security module for user input system 140 and may be programmed with instructions that permit secure use of user input system 140. Additionally, or alternatively, secure applications may be provided via the SIMM cards, along with additional information, such as placing identifying information on the SIMM card in a secure manner. In some embodiments, the user may use applications to execute processes described with respect to the process flows described herein. For example, one or more applications may execute the process flows described herein. In some embodiments, one or more applications stored in the system 130 and/or the user input system 140 may interact with one another and may be configured to implement any one or more portions of the various user interfaces and/or process flow described herein.

The memory 154 may include, for example, flash memory and/or NVRAM memory. In some embodiments, a computer program product may be tangibly embodied in an information carrier. The computer program product may contain instructions that, when executed, perform one or more methods, such as those described herein. The information carrier may be a computer-readable or machine-readable medium, such as the memory 154, expansion memory, memory on processor 152, and/or a propagated signal that may be received, for example, over transceiver 160 and/or external interface 168.

In some embodiments, the user may use the user input system 140 to transmit and/or receive information and/or commands to and/or from the system 130. In this regard, the system 130 may be configured to establish a communication link with the user input system 140, whereby the communication link establishes a data channel (wired and/or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, and/or the like.

The user input system 140 may communicate with the system 130 (and one or more other devices) wirelessly through communication interface 158, which may include digital signal processing circuitry. Communication interface 158 may provide for communications under various modes or protocols, such as GSM voice calls, SMS, EMS, or MMS messaging, CDMA, TDMA, PDC, WCDMA, CDMA2000, GPRS, and/or the like. Such communication may occur, for example, through transceiver 160. Additionally, or alternatively, short-range communication may occur, such as using a Bluetooth, Wi-Fi, and/or other such transceiver (not shown). Additionally, or alternatively, a Global Positioning System (GPS) receiver module 170 may provide additional navigation-related and/or location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker (e.g., in a handset) of user input system 140. Such sound may include sound from voice telephone calls, may include recorded sound (e.g., voice messages, music files, and/or the like) and may also include sound generated by one or more applications operating on the user input system 140, and in some embodiments, one or more applications operating on the system 130.

Various implementations of the systems and techniques described here may be realized in digital electronic circuitry, integrated circuitry, specially designed ASICs (application specific integrated circuits), computer hardware, firmware, software, and/or combinations thereof. Such various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and/or at least one output device.

Computer programs (e.g., also referred to as programs, software, applications, code, and/or the like) may include machine instructions for a programmable processor, and may be implemented in a high-level procedural and/or object-oriented programming language, and/or in assembly/machine language. As used herein, the terms "machine-readable medium" and/or "computer-readable medium" may refer to any computer program product, apparatus and/or device (e.g., magnetic discs, optical disks, memory, Programmable Logic Devices (PLDs), and/or the like) used to provide machine instructions and/or data to a programmable processor, including a machine-readable medium that receives machine instructions as a machine-readable signal. The term "machine-readable signal" may refer to any signal used to provide machine instructions and/or data to a programmable processor.

To provide for interaction with a user, the systems and/or techniques described herein may be implemented on a computer having a display device (e.g., a CRT (cathode ray tube), an LCD (liquid crystal display) monitor, and/or the like) for displaying information to the user, a keyboard by which the user may provide input to the computer, and/or a pointing device (e.g., a mouse or a trackball) by which the user may provide input to the computer. Other kinds of devices may be used to provide for interaction with a user as well. For example, feedback provided to the user may be any form of sensory feedback (e.g., visual feedback, auditory feedback, and/or tactile feedback). Additionally, or alternatively, input from the user may be received in any form, including acoustic, speech, and/or tactile input.

The systems and techniques described herein may be implemented in a computing system that includes a back end component (e.g., as a data server), that includes a middleware component (e.g., an application server), that includes a front end component (e.g., a client computer having a graphical user interface or a Web browser through which a user may interact with an implementation of the systems and techniques described here), and/or any combination of such back end, middleware, and/or front end components. Components of the system may be interconnected by any form or medium of digital data communication (e.g., a communication network). Examples of communication networks include a local area network ("LAN"), a wide area network ("WAN"), and/or the Internet.

In some embodiments, computing systems may include clients and servers. A client and server may generally be remote from each other and typically interact through a communication network. The relationship of client and server may arise by virtue of computer programs running on the respective computers and having a client-server relationship to each other.

The embodiment of the system environment 100 illustrated in FIG. 1 is exemplary and other embodiments may vary. As another example, in some embodiments, the system 130 includes more, less, or different components. As another example, in some embodiments, some or all of the portions of the system environment 100, the system 130, and/or the user input system 140 may be combined into a single portion. Likewise, in some embodiments, some or all of the portions of the system environment 100, the system 130, and/or the user input system 140 may be separated into two or more distinct portions.

In some embodiments, the system environment may 100 include one or more user input systems and/or one or more resource distribution systems (e.g., similar to the system 130 and/or the user input system 140) associated with an entity (e.g., a business, a merchant, a financial institution, a card management institution, an software and/or hardware development company, a software and/or hardware testing company, and/or the like). For example, a user (e.g., an employee, a customer, and/or the like) may use a user input system (e.g., similar to the user input system 140) to provide text-based instructions to perform a resource distribution to a resource distribution system (e.g., similar to the system 130). In some embodiments, the user input system and/or the resource distribution system associated with the entity may perform one or more of the steps described herein with respect to the process flow described herein with respect to FIGS. 2 and/or 3.

FIG. 2 illustrates a process flow 200 for automatically generating resource distributions within a technical environment, in accordance with an embodiment of the invention. In some embodiments, a resource distribution system and/or the like (e.g., similar to one or more of the systems described herein with respect to FIG. 1) may perform one or more of the steps of process flow 200.

As shown in FIG. 2, a system performing process flow 200 may include a parser 202, which includes an input component 204, a named entity recognition component 206, an entity identifier component 208, an entity sorter component 210, an assembler component 212, and an output component 214. In some embodiments, the parser 202 may include a machine learning model trained using historical text-based instruction training data from a historical text-based instruction training data structure 216. For example, the historical text-based instruction training data may include historical text-based instructions (e.g., email messages, SMS messages, recorded speech converted to text, text input to a chat function, text recognized in images, and/or the like) and historical resource distributions generated (e.g., by a user associated with an entity and/or the like) in response to receiving the historical text-based instructions.

In some embodiments, the parser 202 may include a natural language processing system having an artificial-intelligence-driven processing engine. Additionally, or alternatively, the system may receive unstructured text conversations from users and process the unstructured text conversations through an artificial intelligence (AI) pipeline to extract user information and distribution entities (e.g., distribution elements and/or the like), such as source retainer identifiers (e.g., account numbers and/or the like), distribution routing identifiers (e.g., routing numbers), resource amounts, distribution dates, and/or the like. In some embodiments, the artificial-intelligence-driven processing engine may use a convolutional neural network and a cascade of regular expressions to identify distribution entities and/or distribution elements, associate each distribution entity and/or distribution element with a sending user or a recipient user, and group the distribution entities and/or distribution elements into individual resource distributions.

In some embodiments, the parser 202 may include a machine learning model, such as a convolutional neural network, that is initially trained using annotated linguistic data (e.g., the OntoNotes dataset by Spacy and/or the like) and then further trained using historical text-based instruction training data including historical text-based instructions (e.g., email messages, SMS messages, recorded speech converted to text, text input to a chat function, text recognized in images, and/or the like) and historical resource distributions generated (e.g., by a user associated with an entity and/or the like) in response to receiving the historical text-based instructions. For example, the convolutional neural network may have an architecture that embeds each token into a 128-dimension vector using a variation of Bloom embeddings, processes the embeddings through a 4-layer trigram convolutional neural network to generate a tensor representation of a document, and iterates through the tensor representation and predicts the tag on each token based on the surrounding tokens.

In some embodiments, a regular expression component of the parser 202 reads the tokens and tags of a previous component and identifies and/or overrides tags based on regular expression rules. For example, additional source retainer identifiers may be tagged by identifying text such as alphanumeric sequences that are neighbored by identifier tokens such as "SWIFT" or "ABA" or country-specific character patterns of international source retainer identifiers (e.g., international bank account numbers and/or the like).

Additionally, or alternatively, ambiguous distribution entities and/or distribution elements may be further classified based on surrounding tokens. For example, the system may not be able to initially determine whether some source retainer identifiers refer to a sending source retainer or a receiving source retainer. In such an example, the system may determine whether the source retainer identifiers refer to the sending source retainer or the receiving source retainer based on identifying words that surround the source retainer identifiers, such as "to," "into," "from," and/or the like.

In some embodiments, the system may identify complete and distinct resource distributions by grouping adjacent distribution entities and/or distribution elements based on locations of the distribution entities and/or distribution elements in the text. For example, the system may scan through the text and collect distribution entities and/or distribution elements until a repetition occurs at which point the current resource distribution is determined to be complete and subsequent distribution entities and/or distribution elements are determined to be part of a next resource distribution.

In some embodiments, and as shown in FIG. 2, the process flow 200 may include receiving, using the input component 204, one or more text-based instructions 218. For example, the parser 202 may receive (e.g., from an upstream module) one or more text-based instructions 218 (e.g., email messages, SMS messages, recorded speech converted to text, text input to a chat function, text recognized in images, and/or the like) and preprocess the one or more text-based instructions 218 into text.

As shown in FIG. 2, the process flow 200 may include predicting, using the named entity recognition component 206, distribution entities and/or distribution elements. In some embodiments, the parser 202 may predict, using the named entity recognition component 206, distribution entities and/or distribution elements in the text using statistical patterns learned from training using historical text-based instruction training data. For example, the parser 202 may receive an email containing the following text.

Please transfer $5000 to my mom's checking account and $3000 to my checking account 141414141414.
Thank you.
Karen In such an example, the parser 202 may, using the input component 204, preprocess the email to obtain the text. Additionally, or alternatively, the parser 202 may predict, using the named entity recognition component 206, that "$5000" and "$3000" correspond to money, amounts of resources to be distributed, and/or the like and that "Karen" corresponds to a user.

As shown in FIG. 2, the process flow 200 may include identifying, using the entity identifier component 208, distribution entities and/or distribution elements. In some embodiments, the parser 202 may identify, using the entity identifier component 208, distribution entities and/or distribution elements based on regular expressions and/or based on rules. For example, using the example email text previously described, the parser 202 may identify, using the entity identifier component 208, that "to my mom's checking" and "to my checking" correspond to an account type to which resources are to be distributed and that "141414141414" corresponds to an account number.

As shown in FIG. 2, the process flow 200 may include sorting, using the entity sorter component 210, distribution entities and/or distribution elements. In some embodiments, the parser 202 may sort, using the entity sorter component 210, the distribution entities and/or distribution elements into pre-defined distribution fields based on surrounding words and/or syntactic roots. For example, using the example email text previously described, the parser 202 may determine that "141414141414" corresponds to an account number to which resources are to be distributed.

As shown in FIG. 2, the process flow 200 may include assembling, using the assembler component 212, distribution fields. In some embodiments, the parser 202 may assemble, using the assembler component 212, distribution fields into a distribution based on relative locations of the distribution fields within the text. For example, using the example email text previously described, the parser 202 may assemble, using the assembler component 212, distribution fields into two resource distributions such that "$5000" is combined with "to my mom's checking" in a first resource distribution and "$3000" is combined with "to my checking" and "141414141414" in a second resource distribution.

As shown in FIG. 2, the process flow 200 may include transmitting, using the output component 214, an output to a decision engine 220. In some embodiments, the parser 202 may transmit, using the output component 214, an output (e.g., a structured resource distribution and/or the like) to the decision engine 220, where the output includes one or more resource distributions including distribution fields. For example, using the example email text previously described, the parser 202 may transmit, using the output component 214, an output to the decision engine 220, where the output includes {"to account type":"my mom's checking", "amount":5000.00, "currency":"USD"} and {"to account type":"my checking", "to account number":"141414141414", "amount":3000.00, "currency":"USD"}.

As shown in FIG. 2, the process flow 200 may include determining, with the decision engine 220, whether the output from the parser 202 includes actual distribution elements of a resource distribution. For example, the decision engine 220 may determine whether the output from the parser 202 includes actual distribution elements (e.g., an identifier for an actual sending source retainer, an identifier for an actual receiving source retainer, an actual amount of resources to be distributed, an actual type of resource distribution, an actual type of resources to be distributed, an actual date on which resources are to be distributed, an actual frequency at which resources are to be distributed, an actual type of sending source retainer, an actual type of receiving source retainer, distribution routing identifiers, and/or the like) of a resource distribution such that additional information beyond the information in the output is not required to generate a resource distribution. As shown in FIG. 2, the process flow 200 may include generating the resource distribution 222 based on determining that the output from the parser 202 includes actual distribution elements.

As also shown in FIG. 2, the process flow 200 may include, based on determining that the output from the parser 202 does not include actual distribution elements, determining actual distribution elements 224. For example, the output from the parser 202 may include partial information for one or more of the distribution elements, such as only a type of sending source retainer but not an identifier for the sending source retainer, only a partial identifier for the sending source retainer, and/or the like, and the process flow 200 may include determining actual distribution elements from the partial information.

In some embodiments, and as shown in FIG. 2, the process flow 200 may include determining the actual distribution elements 224 based on historical user data in a historical user information data structure 226 and/or historical resource distribution data in a historical resource distribution information data structure 228. For example, using the example email text previously described, the process flow 200 may determine, based on the identification of the person "Karen" in the mail, an identification of an email address (e.g., an alias) from which the email was sent, the output including "to account type":"my checking", "to account number":"141414141414", and/or the like, actual distribution elements, such as an identifier associated with a sending user (e.g., a client ID, a client name, and/or the like), one or more identifiers of one or more source retainers of the sending user and/or a receiving user, identifiers of one or more source retainers to which the sending user has recently distributed resources, and/or the like. In some embodiments, the historical user data in the historical user information data structure 226 may include aliases (e.g., email addresses, phone numbers, and/or the like) associated with users, source retainers from which users may authorize resource distributions, text which users have used to identify one or more source retainers to which the users have distributed resources, and/or the like. Additionally, or alternatively, the historical resource distribution data in the historical resource distribution information data structure 228 may include identifiers of one or more source retainers to which users have distributed resources, amounts of resources users have distributed in historical resource distributions, receiving user of resource distributions that user have authorized, and/or the like.

In some embodiments, the historical user information data structure 226 and/or the historical resource distribution information data structure 228 may include data that identifies users (e.g., clients, customers, and/or the like) and aliases (e.g., email addresses and/or the like), data that maps users to source retainer officers (e.g., which may be used to determine potential source retainers), data that maps users to source retainer roles (e.g., which may be used to define a scope of eligible source retainers with which a user may distribute resources), and/or the like. Additionally, or alternatively, the historical user information data structure 226 and/or the historical resource distribution information data structure 228 may include data that maps users to other users using associations and/or by defining relationships (e.g., which may be used to define eligible users that may conduct resource distributions on source retainers and/or source retainers to which users may distribute resources), data that maps source retainers to distribution eligibility rules (e.g., which may be used to identify eligible source retainers), and data that maps users and source retainers to historical resource distributions and/or may be used to compute likelihoods of source retainers being a receiving source retainer for a distribution, distribution routing identifiers, and/or other distribution elements (e.g., which may be used to determine complete distribution elements from partial information and/or the like).

In some embodiments, the process flow 200 may include determining, based on historical user data in the historical user information data structure 226 and/or historical resource distribution data in the historical resource distribution information data structure 228, a likelihood of one or more distribution elements being an intended distribution element for a resource distribution element. Additionally, or alternatively, the process flow 200 may include determining, based on historical user data and/or historical resource distribution data (e.g., frequency of usage, timing of usage, and/or the like) and based on partial information in the output from the parser 202, likelihoods of distribution elements being an intended distribution element. For example, based on a type of a source retainer in the output of the parser 202 and a user being associated with multiple source retainers of the type, the process flow 200 may include determining, based on frequency of usage, timing of usage, and/or the like, a likelihood, for each of the source retainers of the multiple source retainers, being an intended source retainer. In such an example, the process flow 200 may include providing, to a user associated with an entity (e.g., for conducting the resource distribution and/or the like), identifiers of the multiple source retainers in an order based on the likelihoods (e.g., with the highest likelihood being listed first and/or the like). Additionally, or alternatively, the process flow 200 may include providing a list ordered based on likelihoods for any distribution element (e.g., for which the output from the parser 202 included partial information, for which complete information cannot be definitively determined, and/or the like). In some embodiments, the list may include distribution elements ranked based on a confidence level of the determination and/or the like.

As shown in FIG. 2, the process flow 200 may include, after determining actual distribution elements 224, providing the actual distribution elements to generate a resource distribution 222. Additionally, or alternatively, the process flow 200 may include providing the actual distribution elements and/or a list ordered based on likelihoods for other actual distribution elements to a user associated with an entity (e.g., for conducting the resource distribution and/or the like). In some embodiments, the process flow 200 may include receiving, from the user associated with the entity, authorization to perform the resource distribution and performing, based on the authorization, the resource distribution (e.g., distributing resources from a sending source retainer to a receiving source retainer and/or the like). Additionally, or alternatively, the process flow 200 may include automatically performing the resource distribution (e.g., distributing resources from a sending source retainer to a receiving source retainer and/or the like).

Process flow 200 may include additional embodiments, such as any single embodiment or any combination of embodiments described below and/or in connection with one or more other processes described elsewhere herein. Although FIG. 2 shows example blocks of process flow 200, in some embodiments, process flow 200 may include additional blocks, fewer blocks, different blocks, or differently arranged blocks than those depicted in FIG. 2. Additionally, or alternatively, two or more of the blocks of process flow 200 may be performed in parallel.

FIG. 3 illustrate a process flow 300 for automatically generating resource distributions within a technical environment, in accordance with an embodiment of the invention. In some embodiments, a resource distribution system and/or the like (e.g., similar to one or more of the systems described herein with respect to FIG. 1) may perform one or more of the steps of process flow 300.

As shown in block 302 of FIG. 3, the process flow 300 may include receiving a text-based instruction (e.g., an email message, an SMS message, recorded speech converted to text, text input to a chat function, text recognized in an image, and/or the like). For example, a resource distribution system may receive one or more text-based instructions (e.g., from one or more users, from one or more data structures, from one or more communication systems, and/or the like).

As shown in block 304 of FIG. 3, the process flow 300 may include parsing, using a machine learning model, the text-based instruction to generate a structured resource distribution including predicted distribution elements. For example, a resource distribution system may parse, using a machine learning model one or more text-based instructions to generate, for each text-based instruction, one or more structured resource distributions including predicted distribution elements.

As shown in block 306 of FIG. 3, the process flow 300 may include determining, based on the text-based instruction, a sender alias from which the text-based instruction was sent. For example, a resource distribution system may determine, based on one or more text-based instructions and for each text-based instruction, a sender alias from which the text-based instruction was sent.

As shown in block 308 of FIG. 3, the process flow 300 may include determining, based on user data in a user information data structure, a user associated with the sender alias. For example, a resource distribution system may determine, based on user data in a user information data structure, a user associated with the sender alias for each text-based instruction of the one or more text-based instructions.

As shown in block 310 of FIG. 3, the process flow 300 may include determining, based on user data associated with the user in the user information data structure and based on the predicted distribution elements, actual distribution elements. For example, a resource distribution system may determine, for each text-based instruction and based on user data associated with the user in the user information data structure and based on the predicted distribution elements, actual distribution elements.

As shown in block 312 of FIG. 3, the process flow 300 may include generating, based on the actual distribution elements, a resource distribution. For example, a resource distribution system may generate, based on the actual distribution elements, one or more resource distributions.

Process flow 300 may include additional embodiments, such as any single embodiment or any combination of embodiments described below and/or in connection with one or more other processes described elsewhere herein.

In a first embodiment, the text-based instruction may include an email message, an SMS message, recorded speech converted to text, text input to a chat function, text recognized in an image, and/or the like.

In a second embodiment alone or in combination with the first embodiment, the process flow 300 may include, when parsing the text-based instruction, parsing, using the machine learning model, the text-based instruction to identify, based on statistical patterns, named elements in the text-based instruction, identify, based on rules, additional elements in the text-based instruction, sort, based on surrounding words in the text-based instruction and syntactic roots, the named elements and the additional elements into the predicted distribution elements, and assemble the predicted distribution elements into the structured resource distribution.

In a third embodiment alone or in combination with any of the first through second embodiments, the predicted distribution elements may include a predicted sending source retainer, a predicted receiving source retainer, a predicted amount of resources to be distributed, a predicted type of resource distribution, a predicted type of resources to be distributed, a predicted date on which resources are to be distributed, a predicted frequency at which resources are to be distributed, a predicted type of sending source retainer, a predicted type of receiving source retainer, and/or the like.

In a fourth embodiment alone or in combination with any of the first through third embodiments, the process flow 300 may include parsing, using the machine learning model, the text-based instruction to determine additional information associated with the text-based instruction.

In a fifth embodiment alone or in combination with any of the first through fourth embodiments, the additional information may include the sender alias, a recipient alias to which the text-based instruction was sent, an entity associated with the resource distribution, a name of the user, an address of the user, content of the text-based instruction, and/or the like.

In a sixth embodiment alone or in combination with any of the first through fifth embodiments, the process flow 300 may include, when determining the user associated with the sender alias, determining, based on the user data in the user information data structure and based on the additional information, the user associated with the sender alias.

In a seventh embodiment alone or in combination with any of the first through sixth embodiments, the process flow 300 may include, when determining the actual distribution elements, determining, based on the user data in the user information data structure associated with the user, based on the predicted distribution elements, and based on the additional information, the actual distribution elements.

In an eighth embodiment alone or in combination with any of the first through seventh embodiments, the actual distribution elements may include an actual sending source retainer, an actual receiving source retainer, an actual amount of resources to be distributed, an actual type of resource distribution, an actual type of resources to be distributed, an actual date on which resources are to be distributed, an actual frequency at which resources are to be distributed, an actual type of sending source retainer, an actual type of receiving source retainer, and/or the like.

In a ninth embodiment alone or in combination with any of the first through eighth embodiments, the process flow 300 may include, when parsing the text-based instruction, parsing, using the machine learning model, the text-based instruction to identify multiple resource distributions within the text-based instruction and generate, for each resource distribution of the multiple resource distributions, a structured resource distribution.

In a tenth embodiment alone or in combination with any of the first through ninth embodiments, the user information data structure includes data that, for a plurality of users, associates users with aliases, associates users to source retainer officers, associates users to source retainer roles, associates users to other users, associates source retainers to distribution eligibility rules, associates users and source retainers to historical resource distributions, and/or the like.

In an eleventh embodiment alone or in combination with any of the first through tenth embodiments, the process flow 300 may include, when determining the actual distribution elements, determining source retainers associated with the user, determining source retainers for which the user is authorized to conduct resource distributions, determining source retainers of other users associated with the user, determining source retainers eligible for resource distributions via text-based instructions, determining source retainers associated with historical resource distributions conducted by the user, and/or the like.

In a twelfth embodiment alone or in combination with any of the first through eleventh embodiments, the process flow 300 may include, when determining the actual distribution elements, determining that a predicted distribution element, of the predicted distribution elements, is a partial distribution element and determining, based on the user data in the user information data structure associated with the user and based on the partial distribution element, an actual distribution element of the actual distribution elements.

In a thirteenth embodiment alone or in combination with any of the first through twelfth embodiments, the process flow 300 may include, when determining the actual distribution elements, determining that multiple possible distribution elements are associated with a predicted distribution element of the predicted distribution elements, determining, based on a frequency of usage of the multiple possible distribution elements and based on a timing of usage of the multiple possible distribution elements, a likelihood of each of the multiple possible distribution elements corresponding to the predicted distribution element, and providing, to another user and in an order based on the likelihood of each of the multiple possible distribution elements corresponding to the predicted distribution element, the multiple possible distribution elements for selection by the other user for generation in the resource distribution.

In a fourteenth embodiment alone or in combination with any of the first through thirteenth embodiments, the process flow 300 may include providing, to another user, the resource distribution for authorization.

In a fifteenth embodiment alone or in combination with any of the first through fourteenth embodiments, the process flow 300 may include performing the resource distribution.

Although FIG. 3 shows example blocks of process flow 300, in some embodiments, process flow 300 may include additional blocks, fewer blocks, different blocks, or differently arranged blocks than those depicted in FIG. 3. Additionally, or alternatively, two or more of the blocks of process flow 300 may be performed in parallel.

As noted above, in some embodiments, the process flow 200 and/or the process flow 300 may include performing one or more of the functions described herein using machine learning and/or a machine learning model. For example, the system may provide data from text-based instructions and/or the like to a machine learning model trained (e.g., using historical data) to output structured resource distributions.

In some embodiments, the system may be configured to implement any of the following applicable machine learning algorithms either singly or in combination: supervised learning (e.g., using logistic regression, using back propagation neural networks, using random forests, decision trees, and/or the like), unsupervised learning (e.g., using an Apriori algorithm, using K-means clustering), semi-supervised learning, reinforcement learning (e.g., using a Q-learning algorithm, using temporal difference learning), and any other suitable learning style. Each module of the system may implement any one or more of: a regression algorithm (e.g., ordinary least squares, logistic regression, stepwise regression, multivariate adaptive regression splines, locally estimated scatterplot smoothing, and/or the like), an instance-based method (e.g., k-nearest neighbor, learning vector quantization, self-organizing map, and/or the like), a regularization method (e.g., ridge regression, least absolute shrinkage and selection operator, elastic net, and/or the like), a decision tree learning method (e.g., classification and regression tree, iterative dichotomiser 3, C4.5, chi-squared automatic interaction detection, decision stump, random forest, multivariate adaptive regression splines, gradient boosting machines, and/or the like), a Bayesian method (e.g., naïve Bayes, averaged one-dependence estimators, Bayesian belief network, and/or the like), a kernel method (e.g., a support vector machine, a radial basis function, a linear discriminant analysis, and/or the like), a clustering method (e.g., k-means clustering, expectation maximization, and/or the like), an associated rule learning algorithm (e.g., an Apriori algorithm, an Eclat algorithm, and/or the like), an artificial neural network model (e.g., a Perceptron method, a back-propagation method, a Hopfield network method, a self-organizing map method, a learning vector quantization method, and/or the like), a deep learning algorithm (e.g., a restricted Boltzmann machine, a deep belief network method, a convolution network method, a stacked auto-encoder method, and/or the like), a dimensionality reduction method (e.g., principal component analysis, partial least squares regression, Sammon mapping, multidimensional scaling, projection pursuit, and/or the like), an ensemble method (e.g., boosting, bootstrapped aggregation, AdaBoost, stacked generalization, gradient boosting machine method, random forest method, and/or the like), and any suitable form of machine learning algorithm. Each processing portion of the system may additionally or alternatively leverage a probabilistic module, heuristic module, deterministic module, or any other suitable module leveraging any other suitable computation method, machine learning method or combination thereof. However, any suitable machine learning approach may otherwise be incorporated in the system. Further, any suitable model (e.g., machine learning, non-machine learning, and/or the like) may be used in generating data relevant to the system. In some embodiments, the one or more machine learning algorithms may be predictive modeling algorithms configured to use data and statistics to predict outcomes with forecasting models.

In some embodiments, the machine learning model may be generated by training on data from text-based instructions, data from resource distributions performed based on text-based instructions, and/or the like over a predetermined past period of time. In doing so, the system may be configured to output structured resource distributions including predicted distribution elements and/or the like. In some embodiments, the one or more machine learning algorithms may be used to calculate likelihoods of a predicted distribution element corresponding to an actual distribution element, confidence levels that a predicted distribution element corresponds to an actual distribution element, and/or the like.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C#, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that may direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments may be configured without departing from the scope and spirit of the invention. Therefore, it is to be understood that, within the scope of the appended claims, the invention may be practiced other than as specifically described herein.

What is claimed is:

1. A system for automatically generating resource distributions, the system comprising:
 a parser comprising a convolution neural network, a named entity recognition component, an entity identifier component, an entity sorter component, and an assembler component;
 a decision engine;
 a historical user information data structure comprising historical user data;
 a historical resource distribution information data structure comprising historical resource distribution data;
 at least one non-transitory storage device; and
 at least one processing device coupled to the parser, the decision engine, the historical user information data structure, the historical resource distribution information data structure, and the at least one non-transitory storage device, wherein the at least one processing device is configured to:
  train the convolution neural network using annotated linguistic data;
  train the convolutional neural network using historical text-based instruction training data comprising historical text-based instructions and historical resource distributions generated in response to receiving the historical text-based instructions;
  receive a text-based instruction;
  preprocess, using the parser, the text-based instruction into text;
  predict, using the named entity recognition component, the convolution neural network, the historical user information data structure, and the historical resource distribution information data structure, predicted distribution entities and predicted distribution elements based on the text;
  identify, using the entity identifier component, the historical user information data structure, and the historical resource distribution information data structure, distribution entities and distribution elements from the predicted distribution entities and the predicted distribution elements;
  sort, using the entity sorter component and the convolutional neural network, the distribution entities and the distribution elements into pre-defined distribution fields;
  assemble, using the assembler component and the convolutional neural network, the distribution entities and the distribution elements in the pre-defined distribution fields into a structured resource distribution;
  determine, using the decision engine, whether the structured resource distribution comprises actual distribution elements;
  determine, in response to determining that the structured resource distribution does not comprise the actual distribution elements, the actual distribution elements by accessing the historical user data in the historical user information data structure and the historical resource distribution data in the historical resource distribution information data structure; and
  generate, based on the actual distribution elements, a resource distribution.

2. The system of claim 1, wherein the text-based instruction comprises at least one of an email message, an SMS message, recorded speech converted to text, text input to a chat function, or text recognized in an image.

3. The system of claim 1, wherein the at least one processing device is configured to:
 when sorting the distribution entities, sort, based on surrounding words in the text-based instruction and syntactic roots, the distribution entities and the distribution elements into the pre-defined distribution fields.

4. The system of claim 1, wherein the predicted distribution elements comprise at least one of a predicted sending source retainer, a predicted receiving source retainer, a predicted amount of resources to be distributed, a predicted type of resource distribution, a predicted type of resources to be distributed, a predicted date on which resources are to be distributed, a predicted frequency at which resources are to be distributed, a predicted type of sending source retainer, or a predicted type of receiving source retainer.

5. The system of claim 1, wherein the at least one processing device is further configured to parse, using the convolutional neural network, the text-based instruction to determine additional information associated with the text-based instruction.

6. The system of claim 5, wherein the additional information comprises at least one of a sender alias from which the text-based instruction was sent, a recipient alias to which the text-based instruction was sent, an entity associated with the resource distribution, a name of a user, an address of the user, or content of the text-based instruction.

7. The system of claim 1, wherein the at least one processing device is configured to:
 identify multiple resource distributions within the text-based instruction; and
 generate, for each resource distribution of the multiple resource distributions, a structured resource distribution.

8. The system of claim 1, wherein the at least one processing device is configured to provide, to another user, the resource distribution for authorization.

9. The system of claim 1, wherein the at least one processing device is configured to perform the resource distribution.

10. A computer program product for automatically generating resource distributions comprising a non-transitory computer-readable medium comprising code causing a first apparatus to:
 train a convolution neural network using annotated linguistic data, wherein the first apparatus comprises (i) a parser comprising the convolution neural network, a named entity recognition component, an entity identifier component, an entity sorter component, and an assembler component, (ii) a decision engine, (iii) a historical user information data structure comprising historical user data, and (iv) a historical resource distribution information data structure comprising historical resource distribution data;
 train the convolutional neural network using historical text-based instruction training data comprising historical text-based instructions and historical resource distributions generated in response to receiving the historical text-based instructions;
 receive a text-based instruction;
 preprocess, using the parser, the text-based instruction into text;
 predict, using the named entity recognition component, the convolution neural network, the historical user information data structure, and the historical resource distribution information data structure, predicted distribution entities and predicted distribution elements based on the text;

identify, using the entity identifier component, the historical user information data structure, and the historical resource distribution information data structure, distribution entities and distribution elements from the predicted distribution entities and the predicted distribution elements;

sort, using the entity sorter component and the convolutional neural network, the distribution entities and the distribution elements into pre-defined distribution fields;

assemble, using the assembler component and the convolutional neural network, the distribution entities and the distribution elements in the pre-defined distribution fields into a structured resource distribution;

determine, using the decision engine, whether the structured resource distribution comprises actual distribution elements;

determine, in response to determining that the structured resource distribution does not comprise the actual distribution elements, the actual distribution elements by accessing the historical user data in the historical user information data structure and the historical resource distribution data in the historical resource distribution information data structure; and generate, based on the actual distribution elements, a resource distribution.

11. The computer program product of claim 10, wherein the text-based instruction comprises at least one of an email message, an SMS message, recorded speech converted to text, text input to a chat function, or text recognized in an image.

12. The computer program product of claim 10, wherein the non-transitory computer-readable medium comprises code causing the first apparatus to:

when sorting the distribution entities, sort, based on surrounding words in the text-based instruction and syntactic roots, the distribution entities and the distribution elements into the predicted pre-defined distribution fields.

13. The computer program product of claim 10, wherein the predicted distribution elements comprise at least one of a predicted sending source retainer, a predicted receiving source retainer, a predicted amount of resources to be distributed, a predicted type of resource distribution, a predicted type of resources to be distributed, a predicted date on which resources are to be distributed, a predicted frequency at which resources are to be distributed, a predicted type of sending source retainer, or a predicted type of receiving source retainer.

14. The computer program product of claim 10, wherein the non-transitory computer-readable medium comprises code causing the first apparatus to, parse, using the convolutional neural network, the text-based instruction to determine additional information associated with the text-based instruction.

15. The computer program product of claim 14, wherein the additional information comprises at least one of a sender alias from which the text-based instruction was sent, a recipient alias to which the text-based instruction was sent, an entity associated with the resource distribution, a name of a user, an address of the user, or content of the text-based instruction.

16. The computer program product of claim 10, wherein the non-transitory computer-readable medium comprises code causing the first apparatus to:

identify multiple resource distributions within the text-based instruction; and generate, for each resource distribution of the multiple resource distributions, a structured resource distribution.

17. The computer program product of claim 10, wherein the non-transitory computer-readable medium comprises code causing the first apparatus to provide, to another user, the resource distribution for authorization.

18. The computer program product of claim 10, wherein the non-transitory computer-readable medium comprises code causing the first apparatus to perform the resource distribution.

19. A method for automatically generating resource distributions, the method comprising:

training a convolution neural network using annotated linguistic data, wherein a first apparatus comprises (i) a parser comprising the convolution neural network, a named entity recognition component, an entity identifier component, an entity sorter component, and an assembler component, (ii) a decision engine, (iii) a historical user information data structure comprising historical user data, and (iv) a historical resource distribution information data structure comprising historical resource distribution data;

training the convolutional neural network using historical text-based instruction training data comprising historical text-based instructions and historical resource distributions generated in response to receiving the historical text-based instructions;

receiving a text-based instruction;

preprocessing, using the parser, the text-based instruction into text;

predicting, using the named entity recognition component, the convolution neural network, the historical user information data structure, and the historical resource distribution information data structure, predicted distribution entities and predicted distribution elements based on the text;

identifying, using the entity identifier component, the historical user information data structure, and the historical resource distribution information data structure, distribution entities and distribution elements from the predicted distribution entities and the predicted distribution elements;

sorting, using the entity sorter component and the convolutional neural network, the distribution entities and the distribution elements into pre-defined distribution fields;

assembling, using the assembler component and the convolutional neural network, the distribution entities and the distribution elements in the pre-defined distribution fields into a structured resource distribution;

determining, using the decision engine, whether the structured resource distribution comprises actual distribution elements;

determining, in response to determining that the structured resource distribution does not comprise the actual distribution elements, the actual distribution elements by accessing the historical user data in the historical user information data structure and the historical resource distribution data in the historical resource distribution information data structure; and generating, based on the actual distribution elements, a resource distribution.

20. The method of claim 19, wherein the text-based instruction comprises at least one of an email message, an SMS message, recorded speech converted to text, text input to a chat function, or text recognized in an image.

\* \* \* \* \*